(12) United States Patent
McKenna et al.

(10) Patent No.: US 8,509,748 B2
(45) Date of Patent: Aug. 13, 2013

(54) TRANSACTION MANAGEMENT SYSTEM IN A MULTICAST OR BROADCAST WIRELESS COMMUNICATION NETWORK

(75) Inventors: Daniel Bernard McKenna, Vail, CO (US); James Michael Graziano, Hotchkiss, CO (US)

(73) Assignee: Lava Two, LLC, Boulder, CO (US)

( * ) Notice: Subject to any disclaimer, the term of this patent is extended or adjusted under 35 U.S.C. 154(b) by 398 days.

(21) Appl. No.: 12/675,349

(22) PCT Filed: Aug. 31, 2007

(86) PCT No.: PCT/US2007/077425
§ 371 (c)(1),
(2), (4) Date: Feb. 25, 2010

(87) PCT Pub. No.: WO2009/029113
PCT Pub. Date: Mar. 5, 2009

(65) Prior Publication Data
US 2010/0241527 A1 Sep. 23, 2010

(51) Int. Cl.
*H04M 3/42* (2006.01)
*G06F 15/16* (2006.01)
*H04N 7/173* (2011.01)

(52) U.S. Cl.
USPC ......... 455/414.1; 709/231; 725/105; 725/123

(58) Field of Classification Search
USPC ............... 709/231; 725/105–134; 455/414.1
See application file for complete search history.

(56) References Cited

U.S. PATENT DOCUMENTS

| 5,663,757 | A | * | 9/1997 | Morales ............................. 725/5 |
| 5,697,844 | A | * | 12/1997 | Von Kohorn ..................... 463/40 |
| 5,991,410 | A | | 11/1999 | Albert et al. |
| 6,036,601 | A | | 3/2000 | Heckel |
| 6,098,106 | A | * | 8/2000 | Philyaw et al. ............... 709/238 |
| 6,298,482 | B1 | | 10/2001 | Seidman et al. |
| 6,447,396 | B1 | | 9/2002 | Galyean, III et al. |
| 6,508,706 | B2 | | 1/2003 | Sitrick et al. |
| 6,554,712 | B1 | | 4/2003 | Takahashi |
| 6,594,498 | B1 | | 7/2003 | McKenna et al. |
| 6,628,928 | B1 | * | 9/2003 | Crosby et al. ................... 455/77 |
| 6,681,115 | B1 | | 1/2004 | McKenna et al. |
| 6,708,203 | B1 | | 3/2004 | Makar et al. |

(Continued)

FOREIGN PATENT DOCUMENTS

WO WO-2004084444 A1 9/2004

OTHER PUBLICATIONS

International Search Report in PCT Application Serial No. PCT/US07/077382 dated Apr. 15, 2008, 4 pages.

(Continued)

*Primary Examiner* — Matthew Sams
(74) *Attorney, Agent, or Firm* — Patton Boggs LLP

(57) ABSTRACT

The reverse path transaction management system enables the subscriber to receive a multicast on their wireless subscriber device via the forward path of a multicast channel or via a unidirectional broadcast channel concurrently with a plurality of other subscribers on the same multicast channel or broadcast channel. The subscribers can simultaneously initiate a transaction to purchase goods and/or services via the reverse path associated with the shared multicast channel or via a separate cellular communication connection associated with the broadcast channel. Typically, goods and/or services are offered to the subscriber as part of the multicast extant on the shared forward channel.

14 Claims, 4 Drawing Sheets

(56) References Cited

U.S. PATENT DOCUMENTS

| | | | |
|---|---|---|---|
| 6,874,029 B2 | 3/2005 | Hutcheson et al. | |
| 6,954,641 B2 | 10/2005 | McKenna et al. | |
| 6,963,545 B1 * | 11/2005 | Ho | 370/282 |
| 6,965,770 B2 | 11/2005 | Walsh et al. | |
| 7,169,052 B2 | 1/2007 | Beaulieu et al. | |
| 7,413,513 B2 | 8/2008 | Nguyen et al. | |
| 7,455,591 B2 | 11/2008 | Nguyen | |
| 7,480,727 B2 | 1/2009 | Domschitz | |
| 7,502,610 B2 | 3/2009 | Maher | |
| 7,546,118 B2 | 6/2009 | Camp, Jr. | |
| 7,720,475 B2 * | 5/2010 | McKenna et al. | 455/435.1 |
| 7,830,388 B1 | 11/2010 | Lu | |
| 7,874,919 B2 | 1/2011 | Paulsen et al. | |
| 7,881,944 B2 | 2/2011 | Heller et al. | |
| 7,892,097 B2 | 2/2011 | Muir et al. | |
| 8,002,636 B2 | 8/2011 | Nogami et al. | |
| 8,015,595 B2 | 9/2011 | Benbrahim | |
| 8,073,433 B2 | 12/2011 | Balestrieri | |
| 8,249,922 B2 * | 8/2012 | Guo et al. | 705/14.1 |
| 2002/0034980 A1 | 3/2002 | Lemmons et al. | |
| 2002/0049037 A1 * | 4/2002 | Christensen et al. | 455/3.06 |
| 2002/0057670 A1 | 5/2002 | Kerns et al. | |
| 2002/0143901 A1 | 10/2002 | Lupo et al. | |
| 2002/0183059 A1 * | 12/2002 | Noreen et al. | 455/427 |
| 2002/0193066 A1 | 12/2002 | Connelly | |
| 2003/0018970 A1 | 1/2003 | McKenna | |
| 2003/0163482 A1 | 8/2003 | Bunney et al. | |
| 2003/0177187 A1 * | 9/2003 | Levine et al. | 709/205 |
| 2003/0208613 A1 | 11/2003 | Signes et al. | |
| 2004/0002049 A1 | 1/2004 | Beavers et al. | |
| 2004/0031052 A1 | 2/2004 | Wannamaker et al. | |
| 2004/0259633 A1 | 12/2004 | Gentles et al. | |
| 2005/0010653 A1 | 1/2005 | McCanne | |
| 2005/0021833 A1 * | 1/2005 | Hundscheid et al. | 709/236 |
| 2005/0027648 A1 | 2/2005 | Knowles et al. | |
| 2005/0039210 A1 | 2/2005 | Dusenberry et al. | |
| 2005/0153778 A1 | 7/2005 | Nelson et al. | |
| 2005/0273808 A1 * | 12/2005 | Zeidman | 725/32 |
| 2006/0080360 A1 | 4/2006 | Young et al. | |
| 2006/0099981 A1 * | 5/2006 | McKenna et al. | 455/508 |
| 2006/0174004 A1 * | 8/2006 | Asthana | 709/225 |
| 2006/0184977 A1 * | 8/2006 | Mueller et al. | 725/86 |
| 2006/0248013 A1 | 11/2006 | Ebert et al. | |
| 2006/0253601 A1 * | 11/2006 | Vedantham et al. | 709/231 |
| 2006/0259469 A1 | 11/2006 | Chiu | |
| 2006/0291489 A1 * | 12/2006 | Naqvi et al. | 370/401 |
| 2007/0099704 A1 | 5/2007 | Liu et al. | |
| 2007/0113179 A1 | 5/2007 | Gibbs et al. | |
| 2007/0168490 A1 | 7/2007 | Kent et al. | |
| 2007/0174887 A1 | 7/2007 | Hu et al. | |
| 2007/0260984 A1 | 11/2007 | Marks et al. | |
| 2007/0299976 A1 | 12/2007 | Zafar et al. | |
| 2008/0052624 A1 | 2/2008 | Roberts et al. | |
| 2008/0120501 A1 * | 5/2008 | Jannink et al. | 713/163 |
| 2008/0123822 A1 | 5/2008 | Sapp et al. | |
| 2008/0165895 A1 | 7/2008 | Lesser et al. | |
| 2009/0083431 A1 | 3/2009 | Balachandran et al. | |
| 2009/0118017 A1 | 5/2009 | Perlman et al. | |
| 2010/0063931 A1 * | 3/2010 | Cole et al. | 705/51 |
| 2011/0107220 A1 | 5/2011 | Perlman | |
| 2011/0188415 A1 | 8/2011 | Graziano | |

OTHER PUBLICATIONS

International Search Report in PCT Application Serial No. PCT/US07/077395 dated Sep. 17, 2008, 4 pages.
International Search Report in PCT Application Serial No. PCT/US07/077405 dated Apr. 23, 2008, 4 pages.
International Search Report in PCT Application Serial No. PCT/US07/077409 dated Apr. 18, 2008, 4 pages.
International Search Report in PCT Application Serial No. PCT/US07/077417 dated Apr. 1, 2008, 3 pages.
International Search Report in PCT Application Serial No. PCT/US07/077421 dated Mar. 14, 2008, 4 pages.
International Search Report in PCT Application Serial No. PCT/US07/077425 dated Mar. 17, 2008, 4 pages.
In the US Patent and Trademark Office U.S. Appl. No. 12/675,356 Final Office Action dated Nov. 21, 2012, 25 pages.
In the US Patent and Trademark Office U.S. Appl. No. 12/675,356 Non-Final Office Action dated May 16, 2012, 25 pages.
In the US Patent and Trademark Office U.S. Appl. No. 12/675,358 Final Office Action dated Jul. 3, 2012, 17 pages.
In the US Patent and Trademark Office U.S. Appl. No. 12/675,358 Non-Final Office Action dated Dec. 7, 2011, 15 pages.
In the US Patent and Trademark Office U.S. Appl. No. 12/675,363 Non-Final Office Action dated Aug. 30, 2012, 8 pages.
In the US Patent and Trademark Office U.S. Appl. No. 12/675,366 Non-Final Office Action dated Feb. 6, 2012, 14 pages.
In the US Patent and Trademark Office U.S. Appl. No. 12/675,369 Non-Final Office Action dated Apr. 5, 2012, 12 pages.
In the US Patent and Trademark Office U.S. Appl. No. 12/675,376 Final Office Action dated May 23, 2012, 10 pages.
In the US Patent and Trademark Office U.S. Appl. No. 12/675,376 Non-Final Office Action dated Nov. 21, 2011, 13 pages.
In the US Patent and Trademark Office U.S. Appl. No. 12/817,418 Final Office Action dated Nov. 28, 2012, 10 pages.
In the US Patent and Trademark Office U.S. Appl. No. 12/817,418 Non-Final Office Action dated Jun. 1, 2012, 13 pages.
In the US Patent and Trademark Office U.S. Appl. No. 12/675,363 Final Office Action dated Feb. 27, 2013, 8 pages.

* cited by examiner

TRANSACTION MANAGEMENT SYSTEM IN A MULTICAST OR BROADCAST WIRELESS COMMUNICATION NETWORK

CROSS-REFERENCES TO RELATED APPLICATIONS

This application is a national stage of PCT Patent Application No. PCT/US07/077425 filed Aug. 31, 2007, and is hereby incorporated by reference to the same extent as though fully disclosed herein. This application also is related to applications titled "Forward Path Multi-Media Management System With End User Feedback To Central Content Sources" filed concurrently herewith; "Forward Path Multi-Media Management System With End User Feedback To Distributed Content Sources" filed concurrently herewith; "Communication Network For A Multi-Media Management System With End User Feedback" filed concurrently herewith; "Gaming System With End User Feedback For A Communication Network Having A Multi-Media Management" filed concurrently herewith; "Gaming Device For Multi-Player Games" filed concurrently herewith; and "Virtual Aggregation Processor For Incorporating Reverse Path Feedback Into Content Delivered On A Forward Path", filed concurrently herewith.

FIELD OF THE INVENTION

This invention relates to multicast wireless communication networks that provide subscribers with access to a plurality of multi-media services by sharing a common forward path of a multicast channel in the cellular communication network among a plurality of wireless subscriber devices, as well as broadcast wireless communication networks that provide subscribers with access to a plurality of multi-media services via a broadcast channel that is separate from the cellular communication network.

BACKGROUND OF THE INVENTION

It is a problem in wireless communication networks that the network topology is exclusively point-to-point, or one-to-one, in nature. This paradigm represents the historical view of wireless communications as a non-wired equivalent of traditional wire-line telephone communication networks which serve to interconnect a calling party with a called party. An additional problem in wireless communication networks is that the need to concurrently serve many voice subscribers with the limited bandwidth available in wireless communication networks has prevented the provision of wide bandwidth communication services, such as broadband data, to these subscribers.

The third generation (3G) wireless communication systems represent a step toward solving the above-noted problems. The third generation wireless communication systems support the provision of advanced packet data services. When the wireless subscriber device is away from its home wireless network (roaming), a special data communications link (Wireless IP tunnel) is established between the visited wireless network and the home wireless network. In this case, IP packets directed to the wireless subscriber device's IP address of the home wireless network are routed to the home wireless network, and a Wireless IP tunnel redirects the IP packets to the visited wireless network where the roaming wireless subscriber device is located and being served.

However, even with advances in bandwidth utilization and the provision of packet data services, wireless communication networks still operate on a point-to-point paradigm, with the networks being unable to concurrently communicate data to a plurality of subscribers, which is the fundamental concept of broadcast communications, especially in the case of a dynamically changing audience for the broadcasts. As a result, wireless data networks are inherently inefficient in terms of spectrum and asset utilization when delivering broadcast-like information to subscribers.

An alternative to the point-to-point paradigm is the multicast, which constitutes multi-media content that is concurrently delivered in a single transmission to a plurality of subscribers who are equipped with wireless subscriber devices. A feature of multicast is that multiple subscribers share a single air interface channel, which extends from the radio transmitter to their wireless subscriber device and comprises the forward path that carries the multicast, to concurrently receive the multi-media content on the same channel.

The present multicast environment presents a problem with respect to the provision of transaction management since a plurality of subscribers is concurrently sharing the same forward path to receive the multi-media content. There is no ability for a subscriber to initiate and effect a transaction without the subscriber originating a separate point-to-point communication connection from the subscriber wireless device to the point-of-sale or point-of-information server, making the process burdensome to the subscriber and disjunct from the advertising or other stimulus that caused the subscriber to initiate this transaction.

New wireless multi-media content delivery architectures, such as MediaFLO ("Media ForwardLinkOnly") and DVB-H (Digital Video Broadcast-Handheld), solve some of the present limitations of multi-media content delivery by using a broadcast architecture to produce a pseudo-multicast delivery and concurrently disseminate the multi-media content to a plurality of wireless subscriber devices. In these architectures (also termed "multicast" herein), a unidirectional multi-media wireless broadcast network transmits multi-media content to selected authorized wireless subscriber devices in a time concurrent fashion, independent of the cellular communication network that is operational in the same coverage area. The wireless subscriber devices used in these broadcast architectures contain a multi-media content broadcast receiver which does not have the capability to communicate in a "reverse path" direction over the broadcast network. That is, the MediaFLO and DVB-H multi-media content broadcast receivers are incapable of transmitting anything, much less processing a "transaction". In the case of MediaFLO, for example, the wireless subscriber device is often a dual mode device which contains both a forward-path-only MediaFLO broadcast receiver for receiving the broadcasted multi-media content (television) as well as a conventional CDMA or GSM cell phone for cellular telephone calls. However, there is no "connectivity" between these essentially two disparate devices housed within a single wireless subscriber device, and the two networks with which they interact are operationally independent. The MediaFLO broadcast receiver cannot communicate with the imbedded cell phone, and the imbedded cell phone cannot communicate with the MediaFLO device during the receipt of the multi-media content.

The MediaFLO and DVB-H multi-media wireless delivery architectures, therefore, are static in their user interface, since there is no interactivity between delivered multi-media content and the subscriber. The processing of a transaction in this environment requires the initiation of a separate point-to-point communication connection from the subscriber wireless device to a point-of-sale or point-of-information server to initiate and effect a transaction, making the process burdensome to the subscriber and disjunct from the advertising or other stimulus that caused the subscriber to initiate this transaction, since there is no coordination between the two activities.

Thus, the state of the art does not enable a Transaction Communication Capability (on the reverse path of the cellular communication network or via some other means) that links received multi-media content with an associated subscriber initiated transaction.

BRIEF SUMMARY OF THE INVENTION

The above-described problems are solved and a technical advance achieved by the transaction management system in a multicast wireless communication network (termed "reverse path transaction management system" herein) that operates with existing multicast wireless communication networks and existing broadcast wireless communication networks to manage subscriber transactions to purchase goods and/or services and to move information.

In a multicast wireless communication network, the extent of the forward path multicast is one or more cells and/or cell sectors, which are grouped to cover a predetermined geographic area, demographic population, or subscriber interest group. Alternatively, in a broadcast wireless communication network, the multi-media content delivery typically is delivered by a single transmitter which serves a very large area, such as a large city. The multicast or broadcast transmits information to subscribers who populate the target audience; and the content of these transmissions can be multi-media in nature, comprising a combination of various forms of media: audio, video, graphics, text, data, and the like.

The technological advance provided by the reverse path transaction management system enables the subscriber to effect a transaction which is driven or influenced from/by multi-media content delivered to the wireless subscriber device over the forward path. This transaction is enabled by a reverse path communication link via the cellular communication network. For example, cell phones are bi-directional devices, but a pure MediaFLO or DVB-H device is only a unidirectional broadcast receiver. However, many MediaFLO wireless subscriber devices also have a bi-directional cell phone; but the two devices, cell phone and MediaFLO receiver, are not "interconnected" for reverse path transaction communication purposes. The reverse path physical and logical inter-connection with the forward path multi-media content delivery (linking the subscriber initiated transaction to the forward path information) and associated process management is described herein.

The reverse path transaction management system enables the subscriber to receive the multicast or MediaFLO/DVB-H broadcast on their wireless subscriber device via the forward path of a multicast/broadcast channel, concurrently with a plurality of other subscribers on the same multicast/broadcast channel, and simultaneously initiate a unique transaction to purchase goods and/or services or to move information via the reverse path associated with the shared multicast channel or over a reverse path on an associated cellular network, respectively. Typically, goods and/or services are offered to the subscriber as part of the multicast/broadcast extant on the shared forward channel, and the individual subscribers receiving the shared multicast/broadcast can elect to purchase the offered goods and/or services by activating a response message that is transmitted over the reverse path, indicating the subscriber's desire to initiate a transaction. The subscriber is uniquely identified as part of the registration process, and can communicate with the Reverse Path Transaction Management System via the reverse path of the multicast channel in a secure, subscriber-specific manner. This enables the subscriber to signal the Reverse Path Transaction Management System of their desire to initiate a transaction by signaling on the reverse path of the multicast channel, yet not have to disconnect from the multicast channel and originate a separate point-to-point communication connection from the wireless subscriber device to the point-of-sale server to initiate and effect a transaction, as is required in existing systems.

DETAILED DESCRIPTION OF THE INVENTION

Wireless Communication Network Philosophy

Figure 1:
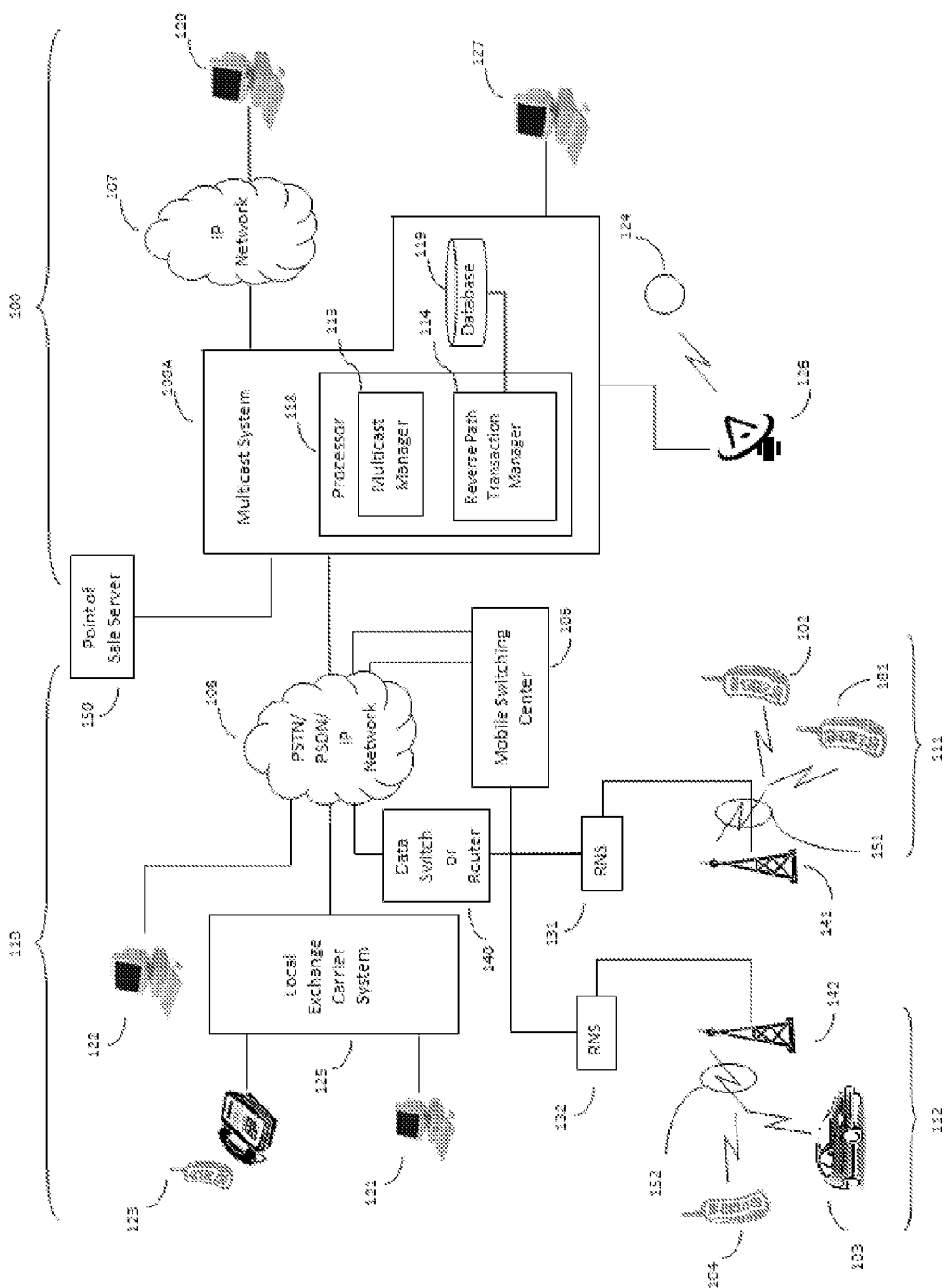
FIG. 1 illustrates, in block diagram form, the overall architecture of a typical cellular communication network that is equipped with the present reverse path transaction management system.

Wireless communication networks 110, as shown in block diagram form in FIG. 1, provide the service of connecting wireless subscriber devices 101-104 to both land-based customers 121-123 who are served by the common carrier Public Switched Telephone Network (PSTN) 108 (via Local Exchange Carrier System 125) as well as other wireless telecommunication customers. In such a network, all of the wireless subscriber device incoming and outgoing calls are routed through an associated Mobile Switching Center (MSC) 106, or via Data Switch or Router 140, which is connected to a plurality of Radio Network Subsystems (RNS) 131, 132 which communicate with wireless subscriber devices 101-104 via Base Devices 141, 142 and located in the area covered by their associated cell sites 111, 112. The Mobile Switching Center 106 uses a Home Location Register (HLR) and a Visited Location Register (VLR) to manage subscriber registration, subscriber authentication, and the provision of wireless services (not shown on FIG. 1). The radio frequency control channels 141, 142 that are available in this system are used to set up the communication connections between the wireless subscriber devices 101-104 and their associated Base Devices 141, 142. The control messages locate and identify the wireless subscriber device, determine the dialed number or the data connection type, and identify an available voice/data communication channel 151, 152 consisting of a pair of radio frequencies and orthogonal coding if CDMA for the radio frequency communication connection.

Philosophy of the Multicast Wireless Communication System

An exemplary narrowcast technology is described in detail in U.S. Pat. No. 6,594,498 and U.S. Pat. No. 6,681,115, for example, and can be used to implement the narrowcast communications between wireless subscriber devices and the radio frequency transmitter-receiver pairs. This technology, as well as the nature of the data transferred in the narrowcast, be it voice, video, telemetry, computer data, and the like, is not intended to be limited to the reverse path transaction management system 114 which is described herein, since a novel system concept is disclosed, not a specific technologically limited implementation of an existing system concept. Therefore, the term "wireless" as it is used herein denotes a communication system which operates on the basis of dividing space into a plurality of volumetric sections or cells 111, 112, and managing communications between wireless subscriber devices 101-104 located in the cells 111, 112 and the associated radio frequency transmitter-receiver pairs located at the cell site 141, 142 for each of these cells 111, 112. The modulation methods and access methods are not limiting factors herein and could be OFDM or QPSK modulated with CDMA access, or they could be QAM modulated with TDMA access. The term "multicast channel" represents a communication channel 151, 152 that carries multi-media content (multicast) simultaneously to a plurality of wireless subscriber devices 101-104 via a forward path and can receive signals from this plurality of wireless subscriber devices 101-104 via a reverse path of the multicast communication channel 151, 152.

The basic functionality of the multicast wireless communication network 100 comprises an information distribution management functionality that concurrently propagates information to a plurality of wireless subscriber devices 101-104, using push, pull, and combinations of push/pull data propagation modes. The need for information dissemination is identified: in response to external events, in response to predetermined temporal/spatial stimuli, as a function of subscriber inquiries or requests, and the like. The multicast wireless communication network 100, in response to an identified information dissemination event, identifies a plurality of cells 111, 112 in the wireless communication network 100 as well as available communication channels 151, 152 in each of these cells 111, 112 to carry the information that is to be transmitted to a plurality of wireless subscriber devices 101-104 extant in the locales served by the selected cells 111, 112. The communication channels 151, 152 can be dedicated to multicast services or can be selected from the pool of available communication channels. The subscribers access the multicasts by selecting the communication channel 151, 152 on their wireless subscriber device 101-104 that carries the multicast. The subscriber can be alerted to the presence of the multicast in many ways or can activate their wireless subscriber device 101-104 to retrieve the multicast absent any alert being transmitted to the wireless subscriber device 101-104. The multicast retrieved by the subscriber is not subscriber-unique, in that the multicast is transmitted to many subscribers, with a plurality of subscribers 101, 102 concurrently accessing the multicast on the same communication channel 151 being a typical mode of operation.

Content Delivery

The content of the multicasts can vary widely and include, but are not limited to: free information, subscription-based information, toll-based information, and the like, as noted above. The content can be locally generated or remotely generated, with the propagation of the information to the various cell sites 111, 112 being implemented in a number of ways. FIG. 1 illustrates, in block diagram form, the overall architecture of a typical multicast wireless communication network 100. In particular, there is a Multicast Manager 113 that functions to receive the program source information from multiple sources and forward this information to selected cell sites 111, 112 for transmission to the subscribers served by these cell sites. The Multicast Manager 113 defines the geographic area, demographic population, or subscriber interest group, which are the metrics used to transmit information to subscribers who populate the target audience for multicast transmissions. The Multicast Manager 113 also can include the selection of frequencies and PN codes (if CDMA) that are used by each cell site to transmit the multicasts to subscribers. The basic content delivery network is independent of the existing radio frequency wireless communication network 100, but it is cooperatively operative with the wireless communication network 100. Thus, it is expected that part of the functionality described herein for the content delivery network can be part of, or integrated with, the wireless communication network 100, as a matter of expediency.

As shown in block diagram form in FIG. 1, the sources of data for the multicast wireless communication network 100 can be varied, and a few typical content sources are shown here to illustrate the concepts of the multicast wireless communication network 100. In particular, the multicast wireless communication network 100 is connected to a plurality of content sources. The sources can be remotely located program sources 124, 120, 122 connected via a satellite uplink 126, IP Network 107, or the Public Switched Telephone Network 108, respectively. Alternatively, the program source can be a local program source 127. The various program sources provide information of various types including, but not limited to: news, advertisements, traffic, weather, travel information, and the like.

The multicast wireless communication network 100 also includes a local mass storage memory 119 (database) for storing control instructions for use by processor 118, as well as program material received from the various program sources identified above. The multicast wireless communication network 100 is controlled by a processor complex that manages the definition of the cells to which a particular multicast is transmitted and integrates information received from the various program sources into multicasts that are transmitted over selected traffic channels of the forward path channel within one or more cells. The multicasts generated by the Multicast Manager 113 are transmitted to the various Radio Network Subsystems 131, 132 either directly or via the associated Mobile Switching Center 106. The Multicast Manager 113 functions to assemble program streams, as described below, and transmit the program streams containing the multicasts via a selected communication medium, such as the Public Switched Telephone Network 108, or some other communication medium, such as an IP network.

Multicast Coverage Areas

The formation of a demographic group within a targeted geographic region is the underlying foundation for multicasting. Within this context, the delivery of multicasts necessitates the creation of non-unique addressing methods, particularly in the Forward Path (base-to-wireless subscriber device). Unique addressing in the reverse path (wireless subscriber device-to-base) enables specialized services, including elements such as billing for: e-commerce, pay-per-event multicasts, and so on. This leverages the infrastructure assets, bandwidth, and channel capacity across a large user group, thereby driving the delivery cost to very low levels on a per subscriber basis.

Dynamic Configuration of Multicast Dynamic Coverage Areas

The multicast wireless communication network 100 can dynamically configure a multicast coverage area, such as the multicast coverage areas described above, as the multicast generation apparatus registers a plurality of subscribers by using the self-registration process for the wireless subscriber devices 101-104. The multicast generation apparatus associates each registered wireless subscriber device 101-104 with a subscriber profile. The multicast generation apparatus can use a common MIN or other common addressing scheme associated with this multicast coverage group, which common MIN or other common addressing scheme is input into the wireless subscriber devices 101-104 of these group members or, alternatively, uniquely identifying the individual members of this multicast coverage group by their wireless subscriber devices 101-104. Once the multicast coverage group is defined, a plurality of cells 111, 112 are selected to form a multicast coverage area group where the spatial extent of a multicast coverage area group can be dynamically established by the presence of wireless subscriber devices 101-104 in the coverage area of various ones of the cells 111, 112. While not shown, the coverage region for a given multicast could also be formed via concatenated or joined cell sectors (versus an un-sectored cell which would generally have a circular pattern coverage). The multicast coverage areas can be spatially and content hierarchical, overlapping in coverage or not, in addition to optionally containing non-contiguous cells, as described above.

Once all of the multicast coverage areas are defined by associating cells 111, 112 for each multicast coverage area group, the Multicast Manager 113 uses this data in managing the delivery of multicasts by transmitting program content, tagged to identify the associated multicast coverage area group(s) to the multicast wireless communication network 100 for transmission to the cells 111, 112 that comprise each of the multicast coverage area groups that have been defined as described above. A multicast can be simultaneously routed to multiple multicast coverage area groups, and subscribers can receive multicasts from multiple multicast coverage area groups, which may not be hierarchically at the same level. Finally, the multicasts are transmitted to the wireless subscriber devices 101-104 that are members of the associated multicast coverage areas.

Multicast Subscriber Registration Management

The multicast process can be conceptually divided into multicast Acquisition, where the multicast control information is delivered to the wireless subscriber device, and multicast Maintenance, where the particular program content contained in the multicast is selected by the subscriber and received on a continuing basis. Multicast control information flows from the Multicast Manager 113 (as described herein) to the Mobile Switching Center 106. The Mobile Switching Center 106 analyzes this multicast control information and, in cooperation with the Radio Network Subsystems 131, 132 served by the Mobile Switching Center 106, selects one or more out-of-band signaling paths to convey multicast acquisition information on the forward path (base-to-mobile) using means well understood in the art. As in traditional telephony, the multicasting network uses standard forward path signaling methods with a logical partition, thereby separating the multicast control information from the control information used for other network services. The multicast network overlay forwards multicast control information to the wireless subscriber device 101-104 for two functions: multicast acquisition and multicast maintenance. The information conveyed includes: multicast region cell/sector code word assignment, cell/sector timing information, available multicasts on a cell/sector basis, and so on. The information conveyed is wholly self-sufficient to enable the wireless subscriber device 101-104 to access and maintain a multicast call without follow-on assistance from the network's out-of-band signaling channels. Thus, the acquisition and maintenance of a multicast involves both out-of-band signaling during the acquisition phase and in-band signaling during the maintenance phase of a multicast.

Reverse Path Transaction Management System

There are two general architectural approaches to wirelessly deliver multi-media content: the broadcast approach adopted by MediaFLO and DVB-H where there is no inherent reverse path to enable a transaction; and the second architectural approach where a cellular network is configured as described above and which has an inherent reverse path capability. In either case, the enablement of "transaction" capability on the reverse path is novel for either architecture, albeit technologically different for the respective two multi-media content delivery architectures.

Reverse Path Transaction Management System in a Cellular Architecture

The reverse path transaction management system 114 enables the subscriber to receive the multicast on their wireless subscriber device 101 via the multicast channel communication connection 151 that includes a forward path, concurrently with a plurality of other subscribers 102 on the same forward path, and simultaneously initiate a transaction to purchase goods and/or services via the reverse path of the multicast channel associated with the shared forward path.

Figure 2:
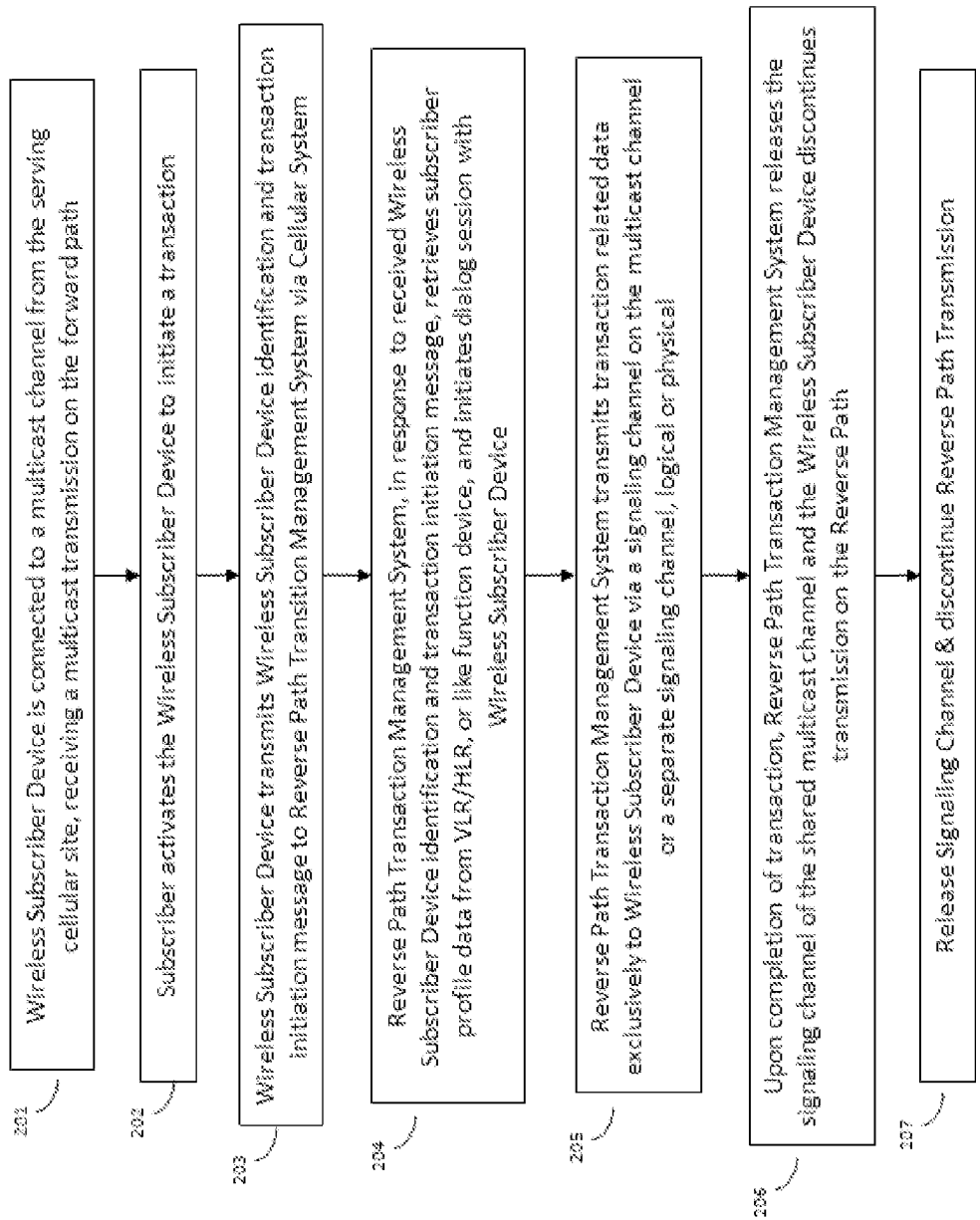
FIG. 2 illustrates, in flow diagram form, the operation of the reverse path transaction management system in a cellular architecture.

FIG. 2 illustrates in flow diagram form the operation of the reverse path transaction management system 114. At step 201, the wireless subscriber device 101 is connected to a multicast channel 151 from the serving cell site 111, receiving a multicast transmission on the forward path of the multicast channel 151 along with other wireless subscriber devices 102. At step 202, the subscriber activates wireless subscriber device 101 to initiate a transaction. This decision can be in response to multi-media content transmitted to the wireless subscriber device 101 on the forward path of the multicast channel 151, where a product or service is advertised as part of the multi-media content. If the subscriber wishes to purchase the advertised product or service, this can be done without having the subscriber disconnect or interrupt the multi-media content that is being delivered on the forward channel of the multicast channel 151. The subscriber is one of a plurality of subscribers whose wireless subscriber devices 101, 102 are concurrently connected to the same multicast channel 151, so all the subscribers are receiving the same multi-media content. However, the subscriber is uniquely identified as part of the above-described registration process, and can communicate with the Reverse Path Transaction Management System 114 via the reverse path of the multicast channel 151 in a secure, subscriber-specific manner. This enables the subscriber to signal the Reverse Path Transaction Management System 114 of their desire to initiate a transaction by signaling on the reverse path of the multicast channel 151, yet not have to disconnect from the multicast channel 151 and originate a separate point-to-point communication connection from the wireless subscriber device 101 to the point-of-sale server 150 to initiate and effect a transaction, as is required in existing systems.

Thus, in response to the subscriber activating wireless subscriber device 101 to initiate a transaction at step 202, the wireless subscriber device 101 transmits a wireless subscriber device identification and transaction initiation message to Serving Mobile Switching Center 106 at step 203 and, at step 204, the Reverse Path Transaction Management System 114, in response to received wireless subscriber device identification and transaction initiation message forwarded by the Serving Mobile Switching Center 106, retrieves subscriber profile data from VLR/HLR of the Serving Mobile Switching Center 106 and initiates a dialog session with wireless subscriber device 101. The data received from the wireless subscriber device 101 may include a tag from the multi-media content to specify which advertised product or service was displayed when the subscriber made their selection, thereby to ensure the proper linking of the transaction to the product or service desired by the subscriber. The subscriber data can include credit card data to enable the transaction to be billed to the subscriber's credit card, or the transaction can be billed to the subscriber's wireless service provider account using their telephone number, or to a third party payment service.

At step 205, the Reverse Path Transaction Management System 114 transmits transaction related data exclusively to wireless subscriber device 101 via a signaling channel on the multicast channel. The signaling channel could be logical or physical in its extent. The subscriber uses the wireless subscriber device 101 at step 206 to complete a transaction via an exchange of messages with the Reverse Path Transaction Management System 114 via the reverse path and an auxiliary channel on the shared multicast channel 151. These information exchanges can include verification of the transaction, authorization to complete the transaction, a further definition of the goods or services desired, delivery instructions, and the like. For example, a pizza advertisement can be presented in the program content, and the subscriber can initiate a pizza delivery. The above-noted interactions can specify the number of pizzas desired and the toppings on each of the pizzas, as well as the delivery address. This enables the subscriber to efficiently order without interrupting the program content. The further information requested from the subscriber can be displayed on a "ticker" line on the screen of the display of the wireless subscriber device 101, and the subscriber can input data via the keypad of the wireless subscriber device 101.

Upon completion of a transaction, the Reverse Path Transaction Management System 114 at step 207 releases the signaling channel of the shared multicast channel 151, and the wireless subscriber device 101 discontinues transmission on the reverse path since the transaction is completed.

Reverse Path Transaction Management System in a Broadcast Architecture

Figure 3:
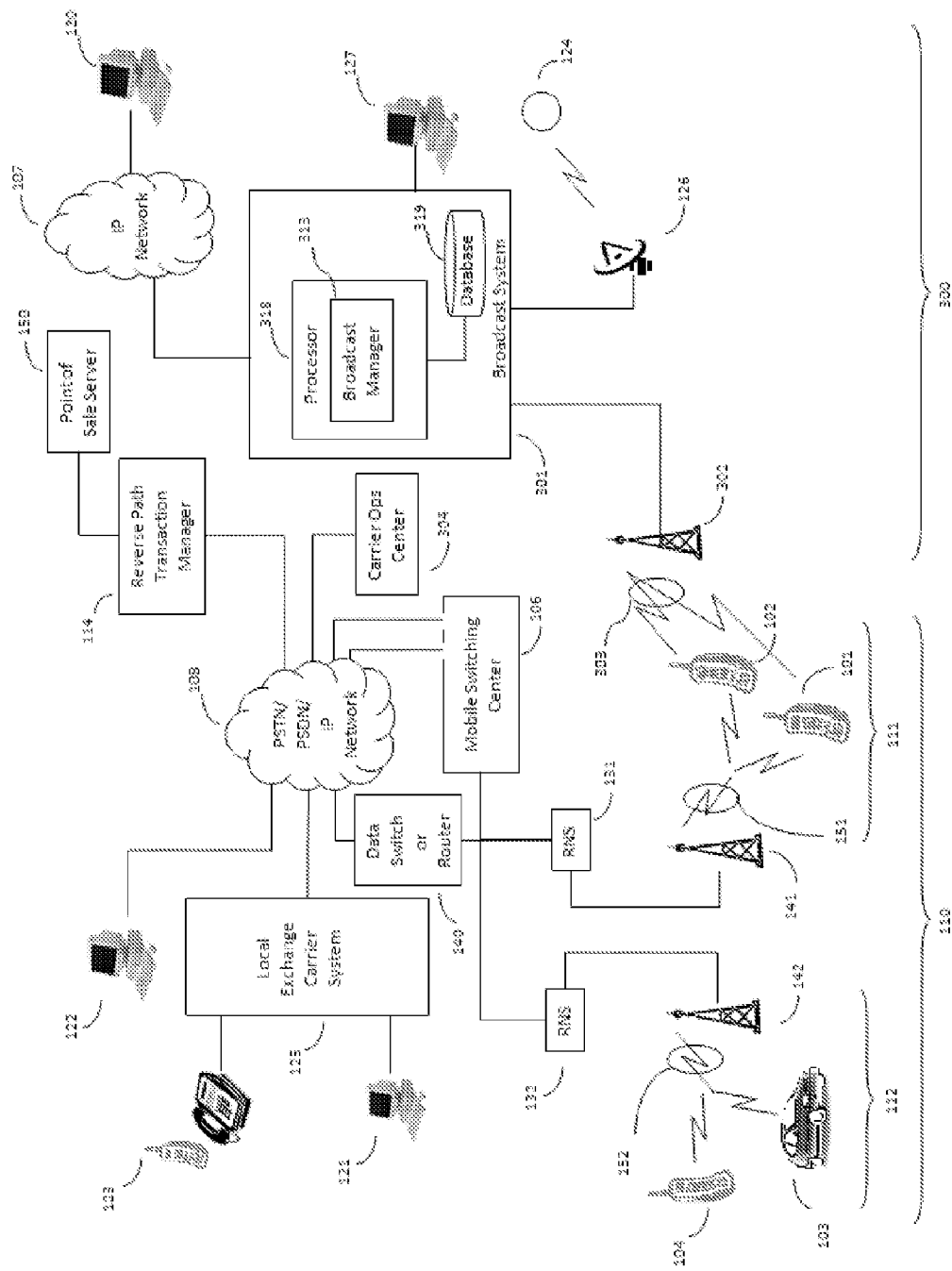
FIG. 3 illustrates, in block diagram form, the overall architecture of a typical broadcast network and its associated cellular communication network that is equipped with the present reverse path transaction management system.

New multi-media wireless delivery architectures such as MediaFLO (Qualcomm trademark—"Media Forward-LinkOnly") and DVB-H (Digital Video Broadcast-Handheld) use a broadcast architecture to distribute multi-media content to subscribers in a predefined service area. FIG. 3 illustrates, in block diagram form, the overall architecture of a typical broadcast network 300 and its associated cellular communication network 110 that is equipped with the present reverse path transaction management system 114. The cellular communication network 110 has an architecture and operation as that described with respect to FIG. 1, so like elements in FIGS. 1 and 3 are labeled identically.

These broadcast architectures rely on the presence and use of an associated cellular communication network 110 to provide the subscriber authentication and authorization functions to enable a subscriber to access the multi-media content being transmitted over the broadcast network 300. In these architectures, a unidirectional multi-media broadcast network 300 transmits multi-media content 303 to wireless subscriber devices 101, 102 independent of the cellular communication network 110 that is operational in the same coverage area. The wireless subscriber devices 101, 102 used in these broadcast architectures contain a multi-media content broadcast receiver which does not have the capability to communicate in a "reverse path" direction over the broadcast network 300. That is, the MediaFLO and DVB-H multi-media content broadcast receivers are incapable of transmitting anything, much less processing a "transaction". In the case of MediaFLO, for example, the wireless subscriber device 101, 102 is often a dual mode device which contains both a forward-path only MediaFLO broadcast receiver for receiving the broadcasted multi-media content (television) 303, as well as a conventional CDMA or GSM cell phone for cellular telephone calls. However, there is no "connectivity" between these two essentially disparate devices housed within a single wireless subscriber device, and the two networks with which they interact are operationally independent. The MediaFLO broadcast receiver cannot communicate with the imbedded cell phone, and the imbedded cell phone cannot communicate with the MediaFLO device during the receipt of the multi-media content.

In particular, as shown in FIG. 3, the multi-media content is delivered to a multi-mode subscriber device 101, 102 via radio frequency transmissions 303, which are broadcast in a predefined coverage area via broadcast transmitters 302. The multi-media content typically is encoded or encrypted to prevent non-subscribers from receiving the multi-media content. The subscriber, therefore, initiates receipt of the broadcast encoded multi-media content 303 by activating the multi-mode subscriber device 101, 102 to access the carrier's operations center 304. This communication typically is effected via the cellular telephone in the multi-mode subscriber device 101, 102, which is used to transmit a registration request to the carrier's operations center 304. The request is processed by the carrier to identify and authenticate the subscriber multi-mode device, verify the authorization of this subscriber to receive the requested service, and return a decryption key to the subscriber multi-mode device 101, 102 to enable it to decrypt the multi-media content 303 that is being broadcast. The broadcast receiver of the multi-mode subscriber device 101, 102 receives the encoded multi-media transmissions 303 and uses the decryption key that was received from the carrier operations center 304 to convert the received encrypted multi-media content into its native format and deliver the multi-media content to the subscriber.

Figure 4:
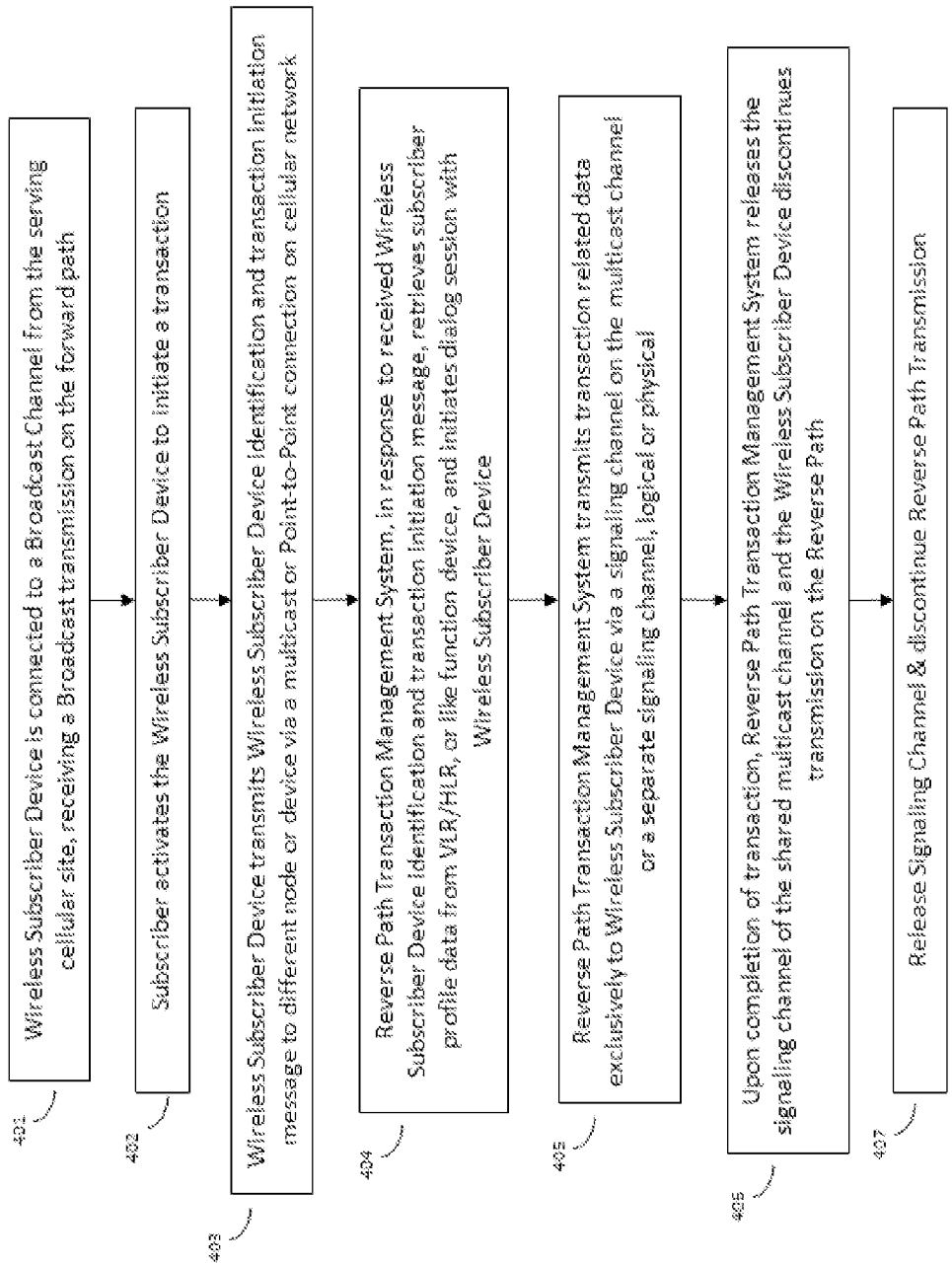
FIG. 4 illustrates, in flow diagram form, the operation of the reverse path transaction management system in a combined broadcast and cellular communication network architecture.

FIG. 4 illustrates, in flow diagram form, the operation of the reverse path transaction management system 114 in this combined broadcast and cellular communication network architecture. At step 401, the wireless subscriber device 101 is connected to a broadcast channel 303 from the serving multi-media content transmitter 302, receiving this transmission on the forward path of the broadcast channel 303 along with other wireless subscriber devices 102. At step 402, the subscriber activates wireless subscriber device 101 to initiate a transaction. This decision can be in response to multi-media content transmitted to the wireless subscriber device 101 on the forward path of the broadcast channel 303 where a product or service is advertised as part of the multi-media content. If the subscriber wishes to purchase the advertised product or service, this can be done without having the subscriber disconnect or interrupt the multi-media content that is being delivered on the forward channel of the broadcast channel 303. The subscriber is one of a plurality of subscribers whose wireless subscriber devices 101, 102 are concurrently connected to the same broadcast channel 303, so all the subscribers are receiving the same multi-media content. The subscriber is uniquely identified as part of the above-described registration process and can communicate with the Reverse Path Transaction Management System 114 via the reverse path of a multicast channel 151 or a point-to-point channel in a secure, subscriber specific manner, using the cell phone that is part of the multi-mode device 101. This enables the subscriber to signal the Reverse Path Transaction Management System 114 of their desire to initiate a transaction by signaling on the reverse path of the multicast channel 151 or a point-to-point channel, yet not have to disconnect from the broadcast channel 303 and originate a separate point-to-point communication connection from the wireless subscriber device 101 to the point-of-sale server 150 to initiate and effect a transaction, as is required in existing systems.

Thus, in response to the subscriber activating wireless subscriber device 101 to initiate a transaction at step 402, the wireless subscriber device 101 transmits wireless subscriber device identification and a transaction initiation message to Serving Mobile Switching Center 106 at step 403 and, at step 404, the Reverse Path Transaction Management System 114, in response to received wireless subscriber device identification and a transaction initiation message forwarded by the Serving Mobile Switching Center 106, retrieves subscriber profile data from VLR/HLR of the Serving Mobile Switching Center 106 and initiates a dialog session with wireless subscriber device 101. The data received from the wireless subscriber device 101 may include a tag from the multi-media content to specify which advertised product or service was displayed when the subscriber made their selection, thereby to ensure the proper linking of the transaction to the product or service desired by the subscriber. The subscriber data can include credit card data to enable the transaction to be billed to the subscriber's credit card, or the transaction can be billed to the subscriber's wireless service provider account using their telephone number, or to a third party payment service.

At step 405, the Reverse Path Transaction Management System 114 transmits transaction related data exclusively to wireless subscriber device 101 via a signaling channel on the multicast channel 151 or a point-to-point channel, which is concurrently active with the broadcast channel 303. The signaling channel could be logical or physical in its extent. The subscriber uses the wireless subscriber device 101 at step 406 to complete a transaction via an exchange of messages with the Reverse Path Transaction Management System 114 via the reverse path or an auxiliary channel on the shared multicast channel 151 or the point-to-point channel. These information exchanges can include verification of the transaction, authorization to complete the transaction, a further definition of the goods or services desired, delivery instructions, and the like. For example, a pizza advertisement can be presented in the program content, and the subscriber can initiate a pizza delivery. The above-noted interactions can specify the number of pizzas desired and the toppings on each of the pizzas, as well as the delivery address. This enables the subscriber to efficiently order without interrupting the program content. The further information requested from the subscriber can be displayed on a "ticker" line on the screen of the display of the wireless subscriber device 101, and the subscriber can input data via the keypad of the wireless subscriber device 101.

Upon completion of a transaction, the Reverse Path Transaction Management System 114 at step 407 releases the signaling channel of the shared multicast channel 151 or the point-to-point channel, and the wireless subscriber device 101 discontinues transmission on the reverse path since the transaction is completed. In this manner, the multi-media content delivery is uninterrupted and delivered over a high bandwidth channel 303, yet the subscriber is able to concurrently execute a transaction which can be coordinated with the multi-media content delivery using the bi-directional communication capability of the associated cellular communication network 110 via either a multicast channel 151 or a point-to-point channel.

SUMMARY

The reverse path transaction management system enables the subscriber to receive the multicast on their wireless subscriber device via the forward channel, concurrently with a plurality of other subscribers on the same forward channel, and simultaneously initiate a transaction to purchase goods and/or services via the reverse path associated with the shared forward channel.

What is claimed as new and desired to be protected by Letters Patent of the United States is:

1. A reverse path transaction management system for providing transaction services to end users who are equipped with wireless end user devices via a wireless communication network that implements a plurality of cell sites, comprising:
   a multicast manager for identifying subscribers, whose wireless end user device is active in a cell site of the wireless communication network, using a unique address for each wireless end user device;
   a processor for identifying groups of the identified subscribers, whose wireless end user device is active in the cell site of the wireless communication network, that have commonality of interest in one of a plurality of available multi-media program sources;
   a unidirectional wireless forward broadcast path, operable in the cell site and connected to and shared by the wireless end user devices of subscribers in an identified group, for concurrently transmitting multi-media content from the one of a plurality of available multi-media program sources to the wireless end user devices of subscribers in the identified group via a multicast on the unidirectional wireless forward broadcast path;
   a plurality of wireless private bidirectional communication paths, each separate from the unidirectional wireless forward broadcast path and unique to each of the wireless end user devices of subscribers in the identified group, for exchanging data between the wireless end user devices and the multicast manager;
   a transaction manager, responsive to one of the wireless end user devices of subscribers in the identified group transmitting a transaction initiation signal on their associated wireless private bidirectional communication path to the multicast manager concurrently with receipt of the multi-media content multicast on the unidirectional wireless forward broadcast path, for identifying the one wireless end user device using the unique address as well as tag information retrieved from the multicast that identifies one of goods and services for purchase presently displayed in the multi-media content multicast; and
   a transaction processor for exchanging data with the one wireless end user device via the wireless private bidirectional communication path using the unique address for the wireless end user device to implement a transaction while the wireless end user device is concurrently receiving the multicast content via the unidirectional wireless forward broadcast path.

2. The reverse path transaction management system of claim 1 wherein the multicast manager comprises:
   a mobile switching center for assigning each of the plurality of wireless end user devices a unique address for use on the wireless private bidirectional communication path.

3. The reverse path transaction management system of claim 1 wherein said transaction manager comprises:
   an end user identification operable concurrently with delivery of the multi-media content to the plurality of wireless end user devices for uniquely identifying the one end user device transmitting a transaction initiation signal.

4. The reverse path transaction management system of claim 3 wherein said transaction manager further comprises:

an end user profile manager, responsive to said end user identification, for retrieving a service profile of the one end user device.

5. The reverse path transaction management system of claim 3 wherein the service profile of the one end user device includes at least one of: end user wireless service account information, end user credit card information, and end user service authorization data.

6. The reverse path transaction management system of claim 1 wherein said transaction processor comprises:
- a transaction tag identification for excerpting advertisement identification data from the multi-media content transmitted via the unidirectional wireless forward broadcast path for identifying a one of a product or service that is the subject of the transaction.

7. The reverse path transaction management system of claim 1 wherein said transaction processor comprises:
- an information exchange for exchanging messages exclusively with the one wireless end user for completion of the transaction, including data relating to at least one of: verification of the transaction, authorization to complete the transaction, a further definition of the goods or services desired, payment instructions, and delivery instructions.

8. A reverse path transaction management method for providing transaction services to end users, who are equipped with wireless end user devices, via a wireless communication network that implements a plurality of cell sites and which comprises a unidirectional wireless forward broadcast path, operable in a cell site and connected to and shared by a plurality of wireless end user devices that are active in the cell site of the wireless communication network, and a plurality of wireless private bidirectional communication paths, each separate from the unidirectional wireless forward broadcast path and unique to each of the plurality of wireless end user devices that are active in the cell site of the wireless communication network, for exchanging data between the wireless end user devices and a multicast manager, said reverse path transaction management method comprising:
- registering each of the plurality of wireless end user devices that are active in a cell site of the wireless communication network;
- identifying groups of the registered subscribers, whose wireless end user device is active in the cell site of the wireless communication network, that have commonality of interest in one of a plurality of available multi-media program sources;
- concurrently transmitting multi-media content from the one of a plurality of available multi-media program sources to the wireless end user devices of subscribers in the identified group served by the unidirectional wireless forward broadcast path via a multicast;
- identifying, in response to one of the plurality of wireless end user devices of subscribers in the identified group transmitting a transaction initiation signal on their associated wireless private bidirectional communication path to the multicast manager concurrently with receipt of the multi-media content multicast on the unidirectional wireless forward broadcast path, the one wireless end user device using the unique address as well as tag information retrieved from the multicast that identifies one of goods and services for purchase presently displayed in the multi-media content multicast; and
- exchanging data with the one wireless end user device via the wireless private bidirectional communication path using the unique address for the wireless end user device to implement a transaction while the wireless end user device is concurrently receiving the multicast content via the unidirectional wireless forward broadcast path.

9. The reverse path transaction management method of claim 8 wherein said step of identifying comprises:
- assigning each of the plurality of wireless end user devices a unique address for use on the wireless private bidirectional communication path.

10. The reverse path transaction management method of claim 8 wherein said step of exchanging comprises:
- uniquely identifying, concurrently with delivery of multimedia content to the plurality of wireless end user devices, the one end user device transmitting a transaction initiation signal.

11. The reverse path transaction management method of claim 10 wherein said step of exchanging further comprises:
- retrieving, in response to said subscriber identification, a service profile of the one end user device.

12. The reverse path transaction management method of claim 10 wherein the service profile of the one end user device includes at least one of: end user wireless service account information, end user credit card information, and end user service authorization data.

13. The reverse path transaction management method of claim 8 wherein said step of exchanging comprises:
- excerpting advertisement identification data from the multi-media content transmitted via the unidirectional wireless forward broadcast path for identifying a one of a product or service that is the subject of the transaction.

14. The reverse path transaction management method of claim 8 wherein said step of exchanging comprises:
- exchanging messages exclusively with the one wireless end user for completion of the transaction, including data relating to at least one of: verification of the transaction, authorization to complete the transaction, a further definition of the goods or services desired, payment instructions, and delivery instructions.

* * * * *